United States Patent [19]

Paddock

[11] 4,407,141
[45] Oct. 4, 1983

[54] TEMPERATURE SENSING MEANS FOR REFRIGERATOR

[75] Inventor: Stephen W. Paddock, Knight Township, Vanderburg County, Ind.

[73] Assignee: Whirlpool Corporation, Benton Harbor, Mich.

[21] Appl. No.: 336,771

[22] Filed: Jan. 4, 1982

[51] Int. Cl.³ .................... G01K 13/00; G05D 23/00; G08B 17/00
[52] U.S. Cl. .................................... 62/130; 62/209; 236/94; 340/585
[58] Field of Search ................. 62/125, 126, 127, 128, 62/129, 130, 208, 209, 211, 214, 156, 215; 236/94, 91 R; 165/11 R, 28; 340/585, 584, 588, 595

[56] References Cited

U.S. PATENT DOCUMENTS

| | | | |
|---|---|---|---|
| 2,148,643 | 2/1939 | Ridge | 62/209 |
| 2,200,657 | 5/1940 | Shaw | 62/209 |
| 2,208,267 | 7/1940 | Ridge | 62/214 |
| 2,396,559 | 3/1946 | Dillman | 62/209 |
| 3,138,006 | 6/1964 | Moorman et al. | 62/156 |
| 3,594,752 | 7/1971 | Alton | 340/228 |
| 3,707,851 | 1/1973 | McAshan, Jr. | 62/125 |
| 3,977,851 | 8/1976 | Toya | 62/135 |
| 4,148,194 | 4/1979 | Kells | 62/3 |

FOREIGN PATENT DOCUMENTS 55-43376  3/1980  Japan ..................... 62/209

Primary Examiner—Albert J. Makay
Assistant Examiner—Harry Tanner
Attorney, Agent, or Firm—Wood, Dalton, Phillips, Mason & Rowe

[57] ABSTRACT

A temperature sensing means for a refrigeration apparatus including sensing means responsive to the temperature within a refrigerated space and to an ambient temperature condition for signalling the temperature condition of the refrigeration apparatus. In the disclosed embodiment, the sensing means is mounted in the access door of the refrigeration apparatus and the temperature sensors are mounted within a single housing. The sensor for sensing the ambient temperature is effectively insulated from the refrigerated space and senses the ambient temperature through a portion of the housing and door. In the illustrated embodiment, the sensing means is used to provide an ambient temperature compensated over-temperature alarm for the refrigeration apparatus.

21 Claims, 5 Drawing Figures

TEMPERATURE SENSING MEANS FOR REFRIGERATOR

BACKGROUND OF THE INVENTION

1. Field of the Invention

This invention relates to refrigeration apparatus and in particular to means for sensing the temperature within a refrigerated space for the purpose of controlling the refrigeration apparatus or for controlling an over-temperature indicator.

2. Description of the Background Art

In a conventional refrigeration apparatus having a compartment refrigerated by suitable refrigerating means, operation of the refrigerating means is typically controlled by a sensor which senses the temperature of the compartment, to cause refrigeration thereof when the temperature rises to a preselected temperature. In one form of such apparatus, the temperature sensor is carried by the door of the refrigeration apparatus.

A problem arises when using a door-mounted temperature sensor in that the temperature to which the sensor is exposed and the temperature of the refrigerated compartment may increase rapidly toward the ambient temperature when the door is opened for a period of time, even though the objects being refrigerated within the compartment do not rise in temperature as rapidly as the air temperature therein. As a result of the temperature sensor in the door being exposed to the relatively higher temperature ambient air and compartment air, the sensor output may not be reliable for purposes of operating an over-temperature alarm or controlling the refrigeration apparatus.

This condition is aggravated when the refrigeration apparatus is being operated in a relatively high ambient temperature. For example, in a conventional refrigeration apparatus having an over-temperature alarm and a sensor operating at a fixed trip point, it is desirable to set the alarm to operate at a sensed temperature of approximately 60° F. The 60° F. trip point is necessary even though the compartment is normally maintained at 34° F.–38° F., in order to prevent unnecessary alarm indications from being given as a result of the high ambient temperature. Where the refrigeration apparatus is provided in an environment of relatively low ambient temperature, the relatively high temperature trip point is undesirable. Under such lower ambient temperature conditions, it would be desirable to lower the trip point to provide a more sensitive operation of the over-temperature indicator.

A number of refrigeration apparatus controls have been developed over the years which are concerned with the problem of controlling the operation of the refrigeration apparatus as a function of sensed temperature. Illustratively, Raymond J. Ridge, in U.S. Pat. No. 2,148,643, shows a refrigerator control having a sensing bulb for sensing the temperature of the evaporator and a bimetallic sensing device within a control mechanism remote from the sensing bulb and subject to air delivered from the rear of the refrigeration apparatus. The control is arranged so that a snap-acting mechanism is caused to have its action varied with changes in ambient temperature so as to vary the temperature at which the evaporator sensing element is effective in controlling the operation of the refrigeration apparatus. The apparatus is provided with an access door remotely spaced from the sensing elements and switch.

In U.S. Pat. No. 3,707,851, Robert B. McAshan, Jr. shows a refrigeration system having first and second sensing means, such as thermistors. One of the thermistors senses the ambient temperature conditions and the other of the thermistors senses the temperature of the refrigerant in the refrigeration system.

Ko Toya, in U.S. Pat. No. 3,977,851, shows an automatic electronic ice-making control system also utilizing a thermistor as a sensing element for terminating an ice-making cycle. A second variable resistance element compensates the characteristics of the thermistor in accordance with ambient temperature conditions to provide an output signal so as to terminate ice-making operation upon production of substantially the same quantity of ice independent of the season of the year during which the ice-making machine is operative.

SUMMARY OF THE INVENTION

The present invention comprehends an improved temperature sensing means for a refrigeration apparatus, wherein a pair of temperature sensors is carried by an access door to the refrigerated compartment. One of the sensors senses the temperature of the refrigerated chamber, or compartment, and the other sensor senses the ambient temperature adjacent the door.

In the illustrated embodiment, the sensing means comprises a portion of a sensing and display system carried by the access door of the refrigeration apparatus. More specifically, in the illustrated embodiment, the improved sensing means operates an over-temperature alarm so as to warn the user of the existence of an undesirable temperature condition within the refrigerated compartment.

The invention comprehends providing both sensors within a single housing and, in the illustrated embodiment, the housing is mounted within the access door. One of the sensors is exposed to the refrigerated air within the refrigerated chamber, or compartment, and the other of the sensors is in thermal transfer association, through the housing and door, with the ambient air adjacent the door.

The sensing means is arranged so that the trip point produced by the joint action of the sensors varies as a function of the sensed ambient temperature. Resultingly, the trip point is reduced at low ambient temperatures to provide a more sensitive operation of the over-temperature indicator.

The invention thus comprehends the provision of means mounted within the refrigeration apparatus for sensing the ambient temperature.

In the illustrated embodiment, the sensor for sensing the ambient temperature is effectively insulated from the refrigerated air within the refrigerated compartment by suitable insulation means within the housing.

The temperature sensing means of the present invention is simple, economical of construction, and provides facilitated assembly of the refrigeration apparatus, while yet providing an improved temperature sensing function.

BRIEF DESCRIPTION OF THE DRAWING

Other features and advantages of the invention will be apparent from the following description taken in connection with the accompanying drawings wherein.

DESCRIPTION OF THE PREFERRED EMBODIMENT

Figure 2:
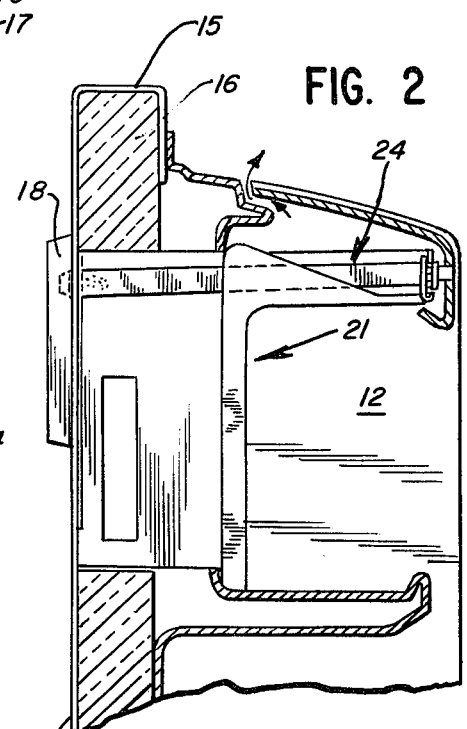
FIG. 2 is a fragmentary enlarged vertical section taken substantially along the line 2—2 of FIG. 1 illustrating the mounting of the sensing means housing within the access door of the refrigerator.

In the exemplary embodiment of the invention as disclosed in the drawing, a refrigeration apparatus generally designated 10 illustratively comprises a side-by-side refrigerator-freezer housed within a cabinet 11. The refrigerator portion of the apparatus defines a refrigerated compartment 12 defining an access opening 13 selectively closed by a door 14. As seen in FIG. 2, the door is defined by an outer panel 15 and is provided with suitable insulation 16.

Figure 1:
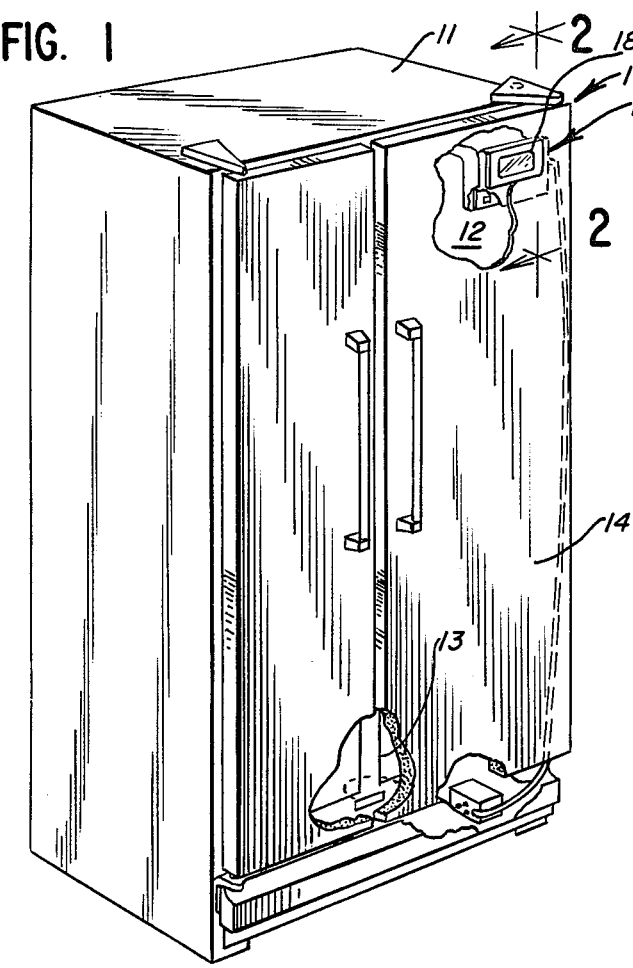
FIG. 1 is a perspective view of a refrigeration apparatus having an improved temperature sensing means embodying the invention.

Mounted in door 14 is an over-temperature indicator device generally designated 17 comprising an electronic display similar to that disclosed in copending U.S. Letters patent application Ser. No. 255,672, of myself and Ralph Tate, Jr., entitled "Door Mounted Electronic Housing Assembly For Refrigerator", filed Apr. 20, 1981, the disclosure of which is incorporated herein by reference. The indicator device, as seen in FIG. 1, includes a display panel 18 similar to the panel disclosed in the above-identified application, for providing visual indications to a user viewing the front of the refrigeration apparatus which, as disclosed in that application, may include an over-temperature indicator indicating an undesirably high temperature condition within the refrigerated compartment 12. Thus, indicator device 17 effectively comprises a means for providing a signal for indicating an undesirable temperature condition which may result from the failure of the refrigerating means 19 (FIG. 5) provided for refrigerating the chamber 12. Such refrigerating means may comprise conventional refrigerating means well-known in the art and requires no further description herein.

As discussed briefly above, the temperature of the air within refrigerated space 12 tends to rise when the access door 14 is opened to provide user access to the refrigerated compartment. Thus, while the indicating means 17 normally is intended to provide an indication of an over-temperature condition within the refrigerated compartment, such as that resulting from a failure of the refrigerating means 19 or from an improper temperature setting of the temperature control (not shown) for the refrigeration apparatus, the indicating means may be caused to provide an indication of an over-temperature condition simply as a result of high temperature ambient air flowing into the refrigerated compartment, or past the sensing means, as during the time the door is opened. To prevent a spurious indication of an over-temperature condition from arising due to the various effects of a high ambient temperature, the indicating means 17 is caused to operate at a trip point which varies as a function of ambient temperature. Thus, under high ambient conditions the indicating means 17 does not provide an indication to the user of an over-temperature condition until the sensed temperature within the compartment 12 reaches a relatively high temperature such as approximately 60° F., while under low ambient conditions an over-temperature indication is provided at a lower sensed compartment temperature, such as 45° F.

A suitable electronic circuit for use in controlling the display panel 18 is disclosed in my copending U.S. Letters patent application Ser. No. 255,673, entitled "Electronic Sensing And Strobed Display For Refrigerator", filed Apr. 20, 1981. The circuit 20 (FIG. 5) for controlling the display 18 may, if desired, comprise a control identical to that disclosed in said application Ser. No. 255,673.

The present invention, however, comprehends an improved temperature sensing means generally designated 21 which includes a pair of temperature sensors, including sensor 22 for sensing the temperature of the refrigerated air within compartment 12, and sensor 23 for sensing the ambient air temperature. The temperature sensing means 21 provides an output signal to the display circuit 20 which, as described below, is a function of the temperature sensed by both sensors and, thus, provides an improved functioning of the indicating means 17, permitting the compartment trip point temperature to be adjusted in accordance with the ambient temperature condition so as to provide improved sensitivity in the over-temperature indicating control.

Figure 3:
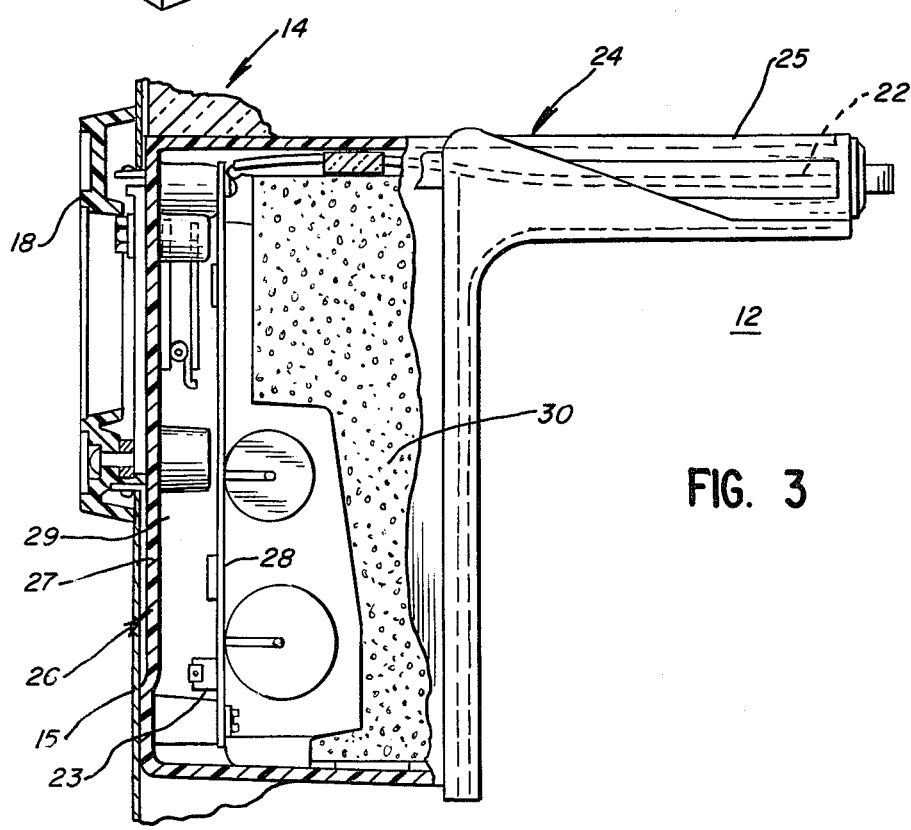
FIG. 3 is a fragmentary further enlarged vertical section of the sensing means mounted within the access door.

As shown in FIGS. 2 and 3, the temperature sensors are mounted in a single housing 24 which, in turn, is mounted within the door 14. The housing includes an upper rear portion 25 which carries the sensor 22. Sensor 22 is disposed so as to be in heat transfer association with the air within the compartment 12. The specific manner in which sensor 22 communicates with the compartment air and the details of using such a sensor for controlling an over-temperature indication are disclosed in the above-identified applications.

With reference to FIG. 3, housing 24 includes a front portion 26 defined by a front wall 27. A circuit board 28 is spaced inwardly of the front wall 27 to define a space 29 therebetween. As shown, sensor 23 is mounted to the lower portion of a circuit board 28, in heat transfer association with the air within space 29. More specifically, sensor 23 is located adjacent a portion of housing wall 27 which directly contacts the outer door panel 15 at a point which is spaced from display panel 18 and directly exposed to the ambient temperature. Thermal insulation 30 is provided within the housing, positioned rearwardly of circuit board 28 so as to effectively define a wall which insulates sensor 23 from the temperature conditions within the refrigerated compartment 12. With this arrangement, the temperature of sensor 23 tracks the ambient temperature adjacent the outer door panel 15 quite closely. The panel 15 remains substantially at ambient temperature, and the temperature response of sensor 23 is largely due to the contacting of panel 15 by housing wall 27 and the proximity of sensor 23 to the panel 15, coupled with the effect of insulation 30.

As indicated above, temperature sensing means 21 provides a coordination of the signal sensed by sensors 22 and 23 so as to provide an improved signal to the display cirucit 20 associated with the refrigeration apparatus 19 and indicating means 17.

Figure 4:
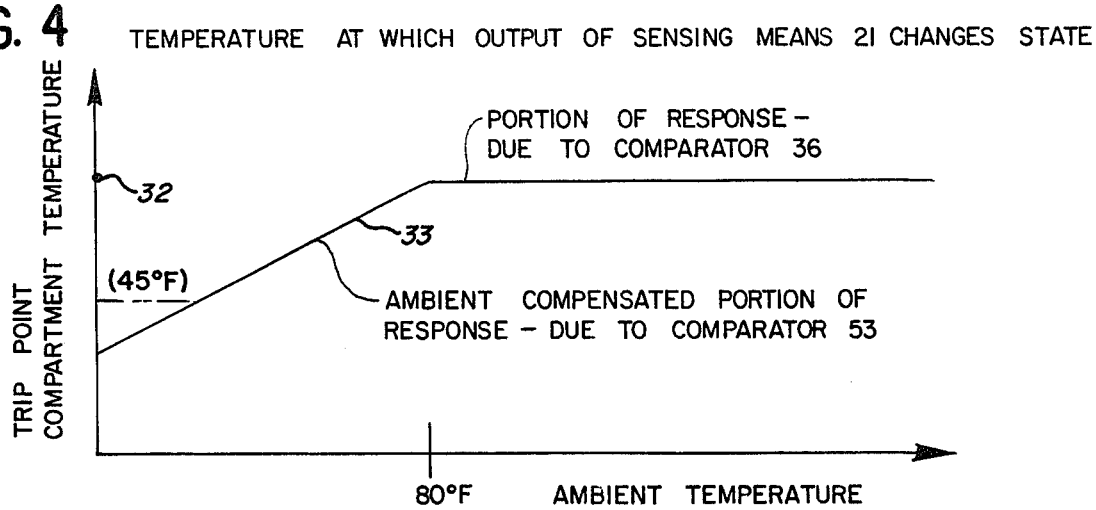
FIG. 4 is a diagram illustrating the manner in which the compartment temperature trip point for the sensing means varies with the ambient temperature.

The coordinated action of the sensors is graphically illustrated in FIG. 4. As shown in FIG. 4, the circuitry associated directly with sensor 22 provides a signal at a compartment temperature trip pont 32, such as 60° F., irrespective of changes in the ambient temperature. Additional circuitry within the temperature sensing means 21 is arranged so as to cause the trip point to be varied as a function of the ambient temperature sensed by sensor 23. As illustrated in FIG. 4, the temperature sensing means 21 is arranged to provide a signal at the 60° F. trip point sensed by sensor 22 when the ambient temperature sensed by sensor 23 is approximately 80° F. or more. However, as the ambient temperature decreases below 80° F., the trip point is correspondingly lowered as a result of the operation of sensor 23 and its associated circuitry so that at lower ambient temperature conditions, indicating means 17 may indicate an over-temperature condition at compartment temperatures below 60° F.

Figure 5:
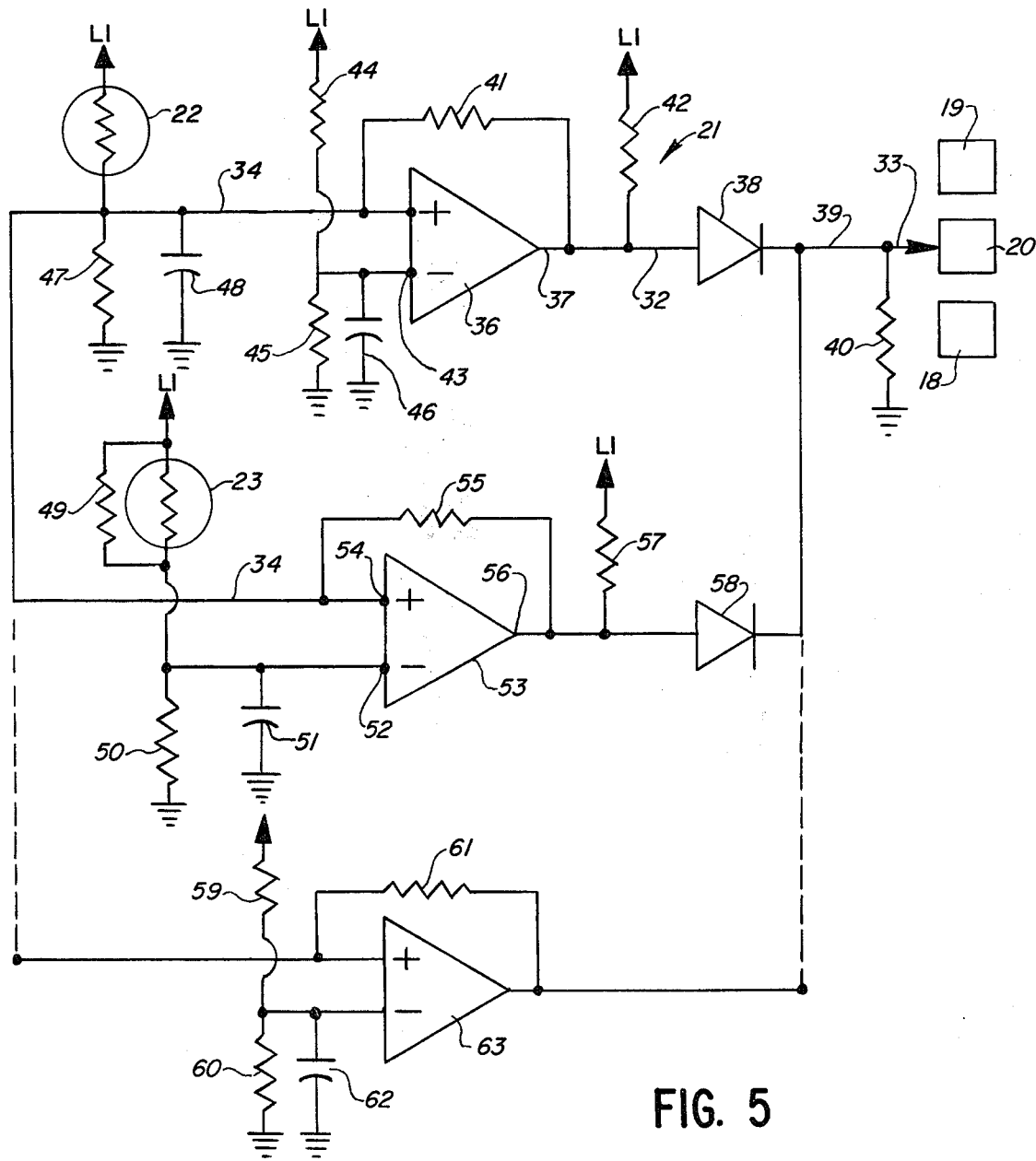
FIG. 5 is a schematic electrical wiring diagram of a control utilizing the sensors of the invention.

The coordination of the sensors 22 and 23 may be effected by suitable circuitry, and as discussed above, in the illustrated embodiment, the temperature sensing means 21 is utilized to provide an improved, ambient compensated over-temperature signal. More specifically, as shown in FIG. 5, thermistor 22 is connected from a power supply lead L1 to a lead 34. The sensor thermistor 22 may comprise a thermistor having 20 Kohms resistance at approximately 25° C. Lead 34 is connected to the noninverting terminal of a comparator 36. The output 37 of the comparator is connected through a diode 38 to a lead 39, which supplies the output of sensing means 21 to the control 20. Lead 39 is connected through a fixed resistor 40 to ground, resistor 40 illustratively being a 15 Kohm resistor. Resistor 40 maintains lead 39 normally at ground potential.

A resistor 41 is connected between input 35 and output 37 of the comparator, and in the illustrated embodiment, resistor 41 comprises a 6.8 megohm resistor. A 1 Kohm resistor 42 is connected bewteen power supply lead L1 and output 37.

The inverting input 43 is connected to power supply lead L1 through a 30.5 Kohm resistor 44 and to ground through a 30.5 Kohm resistor 45 in parallel with a 0.022 microfarad capacitor 46. Lead 34 is connected to ground through a 30.5 Kohm resistor 47 and a 0.022 microfarad capacitor 48 in parallel therewith.

Sensor 23 comprises a thermistor having a 20 Kohm resistance at approximately 25° C., and has a resistor 49 in parallel therewith. Thermistor 23 is connected to ground through a resistor 50 in parallel with a 0.022 microfarad capacitor 51. The thermistor 23 is further connected to the inverting input 52 of a second comparator 53, and thermistor 22 is connected via lead 34 to a noninverting input 54 thereof. A 6.8 megohm resistor 55 is connected between the noninverting input 54 and output 56 of the comparator 53. The output is connected through a 1 Kohm resistor 57 to power supply lead L1, and to a second diode 58. Diodes 38 and 58 comprise an OR gate which is connected to lead 39, as shown in FIG. 5, to complete the control circuitry.

The sensing means 21 functions so as to provide a high output signal at a compartment temperature trip point which varies with the ambient temperature, as shown by curve 33 in FIG. 4. This high output signal corresponds to an over-temperature condition. Thus, whenever the sensor 22 senses a predetermined high temperature condition within the chamber 12, such as over 60° F., comparator 36 toggles and forces the output signal on lead 39 high so as to provide a signal to the control 20 for indicating the over-temperature condition. However, as discussed above, comparator 53 is also coupled to the lead 39 and toggles as a function of the temperature sensed by both thermistor 22 and thermistor 23, so as to lower the compartment temperature at which the signal on lead 39 changes state as a direct function of the ambient temperature sensed by sensor 23.

In the illustrated embodiment, the component valves have been chosen such that comparator 53 controls the output on lead 39 below a preselected ambient temperature, such as 80° F., while comparator 36 controls the output for ambient temperatures above 80° F., as illustrated in FIG. 4. Thus, while comparator 36 goes high when sensor 22 senses a compartment temperature of 60° F. or more, comparator 53 provides an adjusting signal providing the desired lowering of the compartment temperature trip point in correspondence with a lowering of the ambient temperature, so as to cause the indicator 18 to display an over-temperature condition at correspondingly lower compartment temperatures, thereby providing improved sensitivity in the over-temperature indicating means.

If desired, a third comparator 63 can be connected in circuit with comparators 36 and 53, as shown by the dashed line connections in FIG. 5, and arranged to pull line 39 high for sensed compartment temperatures below 45° F. By way of example, resistors 59, 60 and 61 may have values of 46 Kohm, 30 Kohm and 6.8 megohm, respectively, and capacitor 62 may have a value of 0.022 microfarad. Comparator 63, as well as comparators 36 and 53, may comprise a type LM 339 comparator. This arrangement alters the circuit output on lead 39 as shown by the broken line in FIG. 4, to provide a fixed minimum trip point temperature for very low ambient temperature conditions.

Thus, as shown, the present invention comprehends an improved temperature sensing means for use in a refrigeration apparatus wherein it is desired to provide a signal indicating an over-temperature condition of the apparatus. The invention comprehends providing means for adjusting the temperature trip point so as to lower that trip point as a function of the ambient temperature surrounding the refrigeration apparatus.

Further, the improved temperature sensing means comprehends providing a refrigeration apparatus with a single, self-contained housing which houses a temperature sensor for the refrigerated compartment and an ambient temperature sensor. In the illustrated embodiment, the housing is mounted within the door for controlling access to the refrigerated chamber through the access opening thereto.

In the illustrated embodiment, the sensor for sensing the ambient temperature is mounted in an insulated portion of the housing so as to be responsive to the ambient temperature adjacent the door. As further disclosed in the illustrated embodiment, the ambient temperature sensor senses the ambient temperature through a portion of the housing and door, yet can be effectively sealed within the housing in the refrigeration apparatus.

While the embodiment of the invention illustrated herein is particularly adapted for use with an over-temperature indicating means, it will be appreciated that the invention can also be utilized in association with the temperature control means for a refrigeration apparatus.

The foregoing disclosure of specific embodiments is illustrative of the broad inventive concepts comprehended by the invention.

Having described the invention, the embodiments of the invention in which an exclusive property or privilege is claimed are defined as follows:

1. In a refrigeration apparatus having a cabinet defining a refrigerated compartment and an access opening to said compartment, a door selectively closing said access opening, and means for refrigerating said compartment, the improvement comprising:
   a first temperature sensor carried by said door for sensing the temperature within the refrigerated compartment;
   a second temperature sensor carried by said door and arranged to be primarily responsive to the ambient temperature exteriorly of said refrigeration apparatus adjacent said door; and
   over-temperature indicator circuit means for providing an ambient-compensated signal of the temperature condition within said compartment in accordance with the sensed temperature of said first and second temperature sensors jointly.

2. The refrigeration apparatus improvement of claim 1 wherein said second temperature sensor is mounted within said door.

3. The refrigeration apparatus improvement of claim 1 wherein said first and second temperature sensors are mounted in a common housing.

4. The refrigeration apparatus improvement of claim 1 wherein said first and second temperature sensors are mounted in a common housing carried by said door.

5. The refrigeration apparatus improvement of claim 1 wherein said door defines an outer panel and said first and second temperature sensors are mounted in a common housing which is mounted in direct thermal transfer association with said outer door panel.

6. In a refrigeration apparatus having a cabinet defining a refrigerated compartment and an access opening to said compartment, a door selectively closing said access opening, and means for refrigerating said compartment, the improvement comprising:
   a housing carried by said door; a first temperature sensor for sensing the temperature within the refrigerated compartment;
   a second temperature sensor responsive to the ambient temperature exteriorly of said refrigeration apparatus, said sensors being mounted in said housing; and
   circuit means coupled to said sensors for providing an ambient-compensated signal indicative of a temperature condition of said refrigerated compartment, including means for providing said signal at a variable compartment temperature trip point for sensed ambient temperatures below a predetermined level and providing said signal at a fixed compartment temperature trip point for sensed ambient temperatures above said predetermined level.

7. In a refrigeration apparatus having a cabinet defining a refrigerated compartment and an access opening to said compartment, a door selectively closing said access opening, and means for refrigerating said compartment, the improvement comprising:
   a first temperature sensor for sensing the temperature within the refrigerated compartment;
   a second temperature sensor responsive to the ambient temperature exteriorly of said refrigeration apparatus; and
   circuit means coupled to said sensors for providing a signal indicative of a temperature condition of said refrigerated compartment, including means for providing said signal at a variable compartment temperature trip point for sensed ambient temperatures below a predetermined level and providing said signal at a fixed compartment temperature trip point for sensed ambient temperatures above said predetermined level, said circuit means including a first comparator responsive to said first temperature sensor and a second comparator responsive to both said first and second temperature sensors and OR gate means electronically connected to said comparators for selectively providing said signal.

8. In a refrigeration apparatus having a cabinet defining a refrigerated compartment and an access opening to said compartment, a door selectively closing said access opening, and means for refrigerating said compartment, the improvement comprising:
   a first temperature sensor for sensing the temperature within the refrigerated compartment;
   a second temperature sensor responsive to the ambient temperature exteriorly of said refrigeration apparatus; and
   first circuit means coupled to said first temperature sensor and operative to produce an output signal at a predetermined sensed compartment temperature;
   second circuit means coupled to said first and second temperature sensors and operative to produce an output signal at a sensed compartment temperature which increases as a function of the sensed ambient temperature; and
   third circuit means for combining said first and second output signals to produce a resulting output signal which changes state at a compartment temperature which increases as a function of sensed ambient temperature until a predetermined ambient temperature is sensed.

9. In a refrigeration apparatus having a cabinet defining a refrigerated space and a door for selectively closing said space, an improved temperature sensing means comprising:
   housing means carried by said door;
   thermal insulation means disposed within said housing and defining a first housing portion exposed to the temperature of said refrigerated space and a second housing portion in thermal transfer association with the ambient atmosphere surrounding said refrigeration apparatus;
   a first temperature sensor carried by said first housing portion and exposed to refrigerated air of said refrigerated space;
   a second temperature sensor carried by said second housing portion and arranged to be responsive to said ambient atmosphere; and
   over-temperature indicator electronic circuit means connected to said first and second temperature sensors including means for providing a temperature responsive output signal which is directly related to the ambient atmosphere temperature, the refrigerated space temperature at which said circuit means provides said output signal varying as a function of said ambient atmosphere temperature.

10. The refrigeration apparatus of claim 9 wherein said second temperature sensor is disposed to sense said ambient atmosphere temperature through a portion of said housing.

11. The refrigeration apparatus of claim 9 wherein said second temperature sensor is disposed to sense said ambient atmosphere temperature through a portion of said housing and a portion of said door.

12. The refrigeration apparatus of claim 9 wherein said door includes an outer panel defining an outer surface exposed to the ambient air and an inner surface, and wherein said housing includes a front wall member which is mounted against said door panel inner surface.

13. The refrigeration apparatus of claim 12 wherein said second second temperature sensor is disposed within said housing adjacent said front wall member.

14. In a refrigeration apparatus having insulated wall means including an insulated door defining a refrigerated space and an electrically operated over-temperature indicator for signalling an undesirable temperature condition within said space, the improvement comprising:
- a first temperature sensor on the door exposed to refrigerated air of said refrigerated space and being insulated from the ambient temperature by thermal insulation carried by said door;
- a second temperature sensor disposed within said door and being insulated from the refrigerated air in said space by thermal insulation carried by said door, for sensing the ambient temperature; and
- circuit means connected to said first and second temperature sensors and including means for signalling an over-temperature condition in response to a predetermined temperature sensed by said first sensor, said predetermined sensed temperature being varied in response to variations in said ambient temperature sensed by said second sensor.

15. The refrigeration apparatus improvement of claim 14 wherein a sensor housing is provided within a portion of the door insulation and each of said sensors is mounted within said housing.

16. In a refrigeration apparatus having insulated wall means including an insulated door defining a refrigerated space and an electrically operated over-temperature indicator for signalling an undesirable temperature condition within said space, the improvement comprising:
- temperature sensing means for providing said signal at a trip point temperature, including ambient compensation means for automatically changing the trip point temperature as a direct function of the ambient temperature at said door; and
- means for mounting the temperature sensing means and compensation means together.

17. The refrigeration apparatus improvement of claim 16 wherein said ambient compensation means includes means for sensing the ambient temperature through a portion of the door means.

18. The refrigeration apparatus improvement of claim 16 wherein said temperature sensing means includes sensing means carried by said door for sensing both the ambient temperature and the temperature of air within said refrigerated space.

19. In a refrigeration apparatus having a cabinet defining a refrigerated space and a door including an outer door panel for selectively closing said space, an improved temperature sensing means comprising:
- housing means carried by said door;
- wall means within said housing defining a first housing portion exposed to the temperature within siad refrigerated space and a second housing portion which is disposed in thermal association with the inner surface of said outer door panel;
- a first temperature sensor carried by said first housing portion and responsive to the air within said refrigerated space;
- a second temperature sensor disposed within said second housing portion adjacent said door panel inner surface, whereby said second temperature sensor responds to the ambient temperature adjacent said door; and
- circuit means connected to said first and second temperature sensors and including means for signalling an over-temperature condition within said refrigerated space in response to a predetermined temperature sensed by said first temperature sensor, said predetermined sensed temperature being increased in response to an increase in the ambient temperature sensed by said second sensor.

20. The refrigeration apparatus of claim 19 wherein said wall means within said housing comprises thermal insulation.

21. The refrigeration apparatus of claim 19 wherein said wall means within said housing comprises thermal insulation defining a generally vertical space within said first housing portion and said second temperature sensor is disposed within the lower portion of said vertical space.

* * * * *